UNITED STATES PATENT OFFICE.

CARL BÜCKEL, OF FRANKFORT-ON-THE-MAIN, GERMANY.

MANUFACTURE OF EMULSIONS AND SUBSTANCES FOR USE THEREIN.

1,143,499.     Specification of Letters Patent.     Patented June 15, 1915.

No Drawing.     Application filed May 26, 1914.     Serial No. 841,147.

*To all whom it may concern:*

Be it known that I, CARL BÜCKEL, Ph. D., chemist, a citizen of the Empire of Germany, residing at Frankfort-on-the-Main, Germany, have invented certain new and useful Improvements in the Manufacture of Emulsions and Substances for Use Therein, of which the following is a specification.

It is known that the power of the fats and oils to absorb water is improved by the addition of certain chemical substances.

By my invention particularly suitable substances for this purpose are the acidyl-arylsulfonimids containing an aliphatic acidyl group and corresponding with the formula:

$$Ar.SO_2.NM.Ac$$

wherein Ar stands for aryl, Ac for aliphatic acidyl, and M for hydrogen, ammonium, a metal, etc. Such sulfonimids are, for instance, stearylbenzenesulfonimid or palmityl-para-toluenesulfonimid; they possess the further advantage that they form salts with alkalis, alkaline earths and heavy metals. This latter property is of great value for the preparation of all sorts of emulsions for technical, pharmaceutical and medicinal purposes, particularly when using such emulsions for sprinkling therewith wool to be subsequently used for piece-dyed textile goods, because the emulsifying substance can be more easily removed by washing so that an uneven dyeing, cloudy appearance of the fabric, development of odor in the goods after they have been stored for some time, or the like, is avoided.

Under the term "emulsions" I comprise in this specification emulsions of oils, fats, soaps, carbohydrates and their derivatives; furthermore, ointments, liniments or the like, with or without the addition of soap or the like.

The sodium salt of palmityl-para-toluene-sulfonimid may, for instance, be caused to react with $CaCl_2$, $AgNO_3$ or $HgCl_2$ to form white salts, with $CuSO_4$ to form a slightly greenish salt, and with $FeCl_3$ to form a light yellow salt. These new acidyl-aryl-sulfonimids are obtained by the action of halides of the higher fatty acids upon arylsulfonamids.

The halides of higher fatty acids, such for instance as palmityl chlorid, stearyl chlorid or the like can be easily obtained from pure substances without any by-reaction; however, if there are used the ordinary commercial products which, for instance, contain oleic acid, olein or other unsaponified fats, a partial decomposition occurs besides a discoloration when the product is treated with chlorinating agents, such as phosphorus pentachlorid or thionyl chlorid.

Now I have made the observation that in presence of indifferent solvents, for instance, those which are already employed in the preparation of other acid chlorids, the reaction is much smoother and pure products are directly obtained. This new method has the further advantage that it renders it possible easily to distil off in a vacuum the necessary excess of thionyl chlorid, or the phosphorus oxychlorid produced during the reaction.

Among the acidyl-aryl-sulfonimids there where hitherto known only those containing aromatic acidyl groups, such for instance as $$C_6H_5.SO_2.NH.CO.C_6H_5$$

and $$CH_3.C_6H_4.SO_2.NH.CO.C_6H_5,$$

with the exception of the compound from succinyl chlorid and para-toluenesulfonamid, whereas the halides of the higher fatty acids, such as palmityl chlorid or the like have not yet been caused to react in the manner aforesaid.

My experiments showed that the halides of the higher fatty acids act upon the aryl-sulfonamids without any by-reaction, the corresponding acidyl-aryl-sulfonimids being obtained in quantitative yield; a fact which could not at all be foreseen. As already stated, the said acidyl-aryl-sulfonimids yield salts when combined with alkalis, alkaline earths or heavy metals, a fact which is of particular importance for the purposes for which the products are intended. The new compounds are distinguished from the hitherto known acidyl-aryl-sulfonimids by their aforesaid valuable properties, which consist in raising the melting point of certain fatty-acids, in rendering bases of ointments capable of better absorbing water, in particular suitability for washing-preparations and emulsions, and in rendering phenols or the like soluble in water.

The following examples illustrate the invention:

I. Manufacture of halides of the higher fatty acids.

1. 28.4 kilos of commercial stearic acid are mixed with 30 kilos of carbon tetrachlorid and this mixture is heated on the water bath in a reflux apparatus with 20.8 kilos of phosphorus pentachlorid until there is no further formation of hydrochloric acid. The phosphorus oxychlorid produced during the reaction is then distilled in a vacuum at the water-bath temperature together with the carbon tetrachlorid and it is then possible by further sucking in carbon tetrachlorid to expel all traces of phosphorus oxychlorid without having to raise the temperature.

2. 25.6 kilos of commercial palmitic acid and about 25 kilos of carbon trachlorid are heated in a reflux apparatus at the temperature of the water-bath with about five molecular proportions of thionyl chlorid until the formation of hydrochloric acid ceases. The carbon tetrachlorid thus added is then distilled on the water-bath in a vacuum together with the excess of thionyl chlorid and the remaining traces of hydrochloric acid and thionyl chlorid are expelled by a further addition of carbon tetrachlorid.

II. Preparation of the acidyl-aryl-sulfonimids.

3. 98 kilos of sodium benzenesulfonamid are heated in an oil-bath for about 1–2 hours at about 100—120° C. with 152 kilos of stearic acid chlorid. When recrystallized from alcohol the crude product melts at 104° C.

4. 85 kilos of para-toluenesulfonamid are heated on the water-bath in presence of an indifferent solvent such, for instance, as carbon tetrachlorid, with 137 kilos palmitic acid chlorid, until the evolution of hydrochloric acid ceases. When crystallized from alcohol the product thus obtained melts at 100–102° C.

III. Preparations of ointments, liniments, emulsions or the like.

5. 5 kilos of vaseline melting at 35° C. are mixed with 1 kilo of palmityl-para-toluenesulfonimid; the melting point is thus changed to 75° C.

6. A mixture of 10 kilos of olive oil, and 1 kilo of stearyl-para-toluenesulfonimid to which 3 liters of water are added forms a stable white ointment.

7. A mixture of 45 kilos of cod-liver oil and 5 kilos of ammonium palmityl-para-toluenesulfonimid, to which 50 liters of water are added yields a yellowish white emulsion.

8. A mixture of 6 kilos of ammonium palmityl-para-toluenesulfonimid and 12 kilos of soap of 60 per cent. strength is boiled with 200 liters of water, there are then added, while stirring, 30 kilos of carbon tetrachlorid and the whole is diluted with enough water to make 1000 liters of the composition, which forms a stable emulsion suitable for use as a detergent.

9. A mixture of 6 kilos of potassium stearyl-benzene-sulfonimid and 12 kilos of a soap of 60 per cent. strength is boiled with 200 liters of water; there are then added, while stirring, 30 kilos of lubricating oil and the whole is diluted with enough water to make 1000 liters of the composition, which forms a white, stable emulsion suitable as a lubricant for boring tools.

10. A mixture of 6 kilos of sodium palmityl-para-toluenesulfonimid mixed with 12 kilos of a soap of 60 per cent. strength is boiled with 200 liters of water; there are then added, while stirring, 40 kilos of olein and the whole is diluted with water to make 1000 liters of the composition, which forms a white mucilaginous emulsion suitable as a spinning oil.

11. A mixture of 9 parts by weight of olive oil and 1 part by weight of calcium palmityl-para-toluenesulfonimid to which 3 parts by weight of water are added, forms a mucilaginous emulsion suitable as an ointment.

12. A mixture of 9 parts by weight of arachis oil and 1 part by weight of stearyl-para-toluenesulfonimid of zinc to which 5 parts of water are added, is a stable yellowish-white ointment.

Having now described my invention, what I claim is:—

1. As a new process the manufacture of emulsions, which consists in incorporating with the body to be emulsified an acidyl-aryl-sulfonimid of the general formula $$Ar.SO_2.NM.Ac$$

wherein Ar stands for aryl, M for H, $NH_4$, a metal, and Ac for an aliphatic acidyl.

2. As a new process, the manufacture of an emulsion, which consists in incorporating an acidyl-aryl-sulfonimid-metal with a mixture of soap, water, and olein.

3. As a new process, the manufacture of an emulsion, which consists in incorporating palmityl-para-toluenesulfonimid-sodium with a mixture of soap, water, and olein.

4. As new products, the emulsions obtained by incorporating with bodies to be emulsified, an acidyl-aryl-sulfonimid of the general formula $$Ar.SO_2.NM.Ac$$

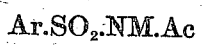

showing, on the one hand, the properties of the emulsified bodies, on the other hand, those of an acidyl-aryl-sulfonimid.

5. As a new product the emulsion obtained by incorporating palmityl-para-toluenesulfonimid-sodium with a mixture of soap, water and olein, being a white, mucilaginous mixture, showing, on the one hand the properties of soap, water and olein, and on the other hand, those of the palmityl-para-toluenesulfonimid-sodium.

In testimony whereof I affix my signature in presence of two witnesses.

CARL BÜCKEL.

Witnesses:
 JEAN GRUND,
 CARL GRUND.

---

Correction in Letters Patent No. 1,143,499.

It is hereby certified that in Letters Patent No. 1,143,499, granted June 15, 1915, upon the application of Carl Bückel, of Frankfort-on-the-Main, Germany, for an improvement in "The Manufacture of Emulsions and Substances for Use Therein," an error appears in the printed specification requiring correction as follows: Page 2, line 21, for the word "trachlorid" read *tetrachlorid;* and that the said Letters Patent should be read with this correction therein that the same may conform to the record of the case in the Patent Office.

Signed and sealed this 3rd day of August, A. D., 1915.

[SEAL.]
            R. F. WHITEHEAD,
              *Acting Commissioner of Patents.*